United States Patent [19]

Shiihara et al.

[11] 4,440,236

[45] Apr. 3, 1984

[54] HYDRAULIC CONTROL SYSTEM FOR A ROCK DRILL

[75] Inventors: Takeo Shiihara; Toshihiro Niihara; Hidemi Iwata; Noboru Ishii, all of Hiroshima, Japan

[73] Assignee: Toyo Kogyo Co. Ltd., Hiroshima, Japan

[21] Appl. No.: 489,608

[22] Filed: May 5, 1983

Related U.S. Application Data

[63] Continuation of Ser. No. 187,639, Sep. 16, 1980, abandoned.

[30] Foreign Application Priority Data

Sep. 20, 1979 [JP] Japan ................................ 54-121527
Sep. 20, 1979 [JP] Japan ................................ 54-121528

[51] Int. Cl.[3] ......................... B23Q 5/033; E21C 5/16
[52] U.S. Cl. ............................................ 173/8; 173/9
[58] Field of Search ......................................... 173/8, 9

[56] References Cited

U.S. PATENT DOCUMENTS 3,802,514 4/1974 Ein et al. ................................ 173/8
3,823,784 7/1974 Feucht .............................. 173/11 X
4,064,950 12/1977 Salmi et al. ......................... 173/9 X
4,246,973 1/1981 Mayer ................................ 173/9 X
4,356,871 11/1982 Fujikawa ............................... 173/8
4,369,848 1/1983 Salmi et al. ............................ 173/8

FOREIGN PATENT DOCUMENTS 2452455 5/1975 Fed. Rep. of Germany ........ 173/12
2511471 9/1975 Fed. Rep. of Germany .......... 173/8
2742851 4/1979 Fed. Rep. of Germany ........ 173/12
1483856 5/1967 France .................................... 173/8

*Primary Examiner*—Robert Mackey
*Attorney, Agent, or Firm*—Fleit, Jacobson, Cohn & Price

[57] ABSTRACT

A rock drill having a hydraulic system for controlling striking, rotating and advancing movements of a drilling rod. The advancing or forward feeding conduit for a feed actuator is provided with a relief valve which is responsive to the pressure in the positive rotating conduit for a rotary actuator so that the pressure in the forward feeding conduit is relieved to weaken the advancing force when the load on the rotary actuator is increased. A further relief valve is also provided for relieving the pressure in the striker conduit to weaken the striking force.

8 Claims, 4 Drawing Figures

HYDRAULIC CONTROL SYSTEM FOR A ROCK DRILL

This application is a continuation of application Ser. No. 187,639, filed 9/16/80, now abandoned.

The present invention relates to a rock drill and more particularly to hydraulic control system for a rock drill.

In general, a rock drill includes a guide cell carrying a drifter which is provided with a hydraulically operated drilling rod. The hydraulic system for actuating the drilling rod includes a striking actuator for applying striking movements to the drilling rod, a reversible rotary actuator for rotating the rod and a reversible feed actuator for advancing the drifter along the guide cell. In conventional rock drills, problems have been encountered when the drilling rod is advanced from a relatively hard layer to a relatively soft layer or to a layer of soil, there will be an abrupt increase in the advancing speed of the rod so that the rod driving torque will correspondingly be increased. This will cause the driving rod to be jammed and clogged in the rock so that there is a high possibility of the rod being damaged.

A further problem in the conventional rock drill has been encountered in the initial period or initial stage of drilling operation. In the beginning of the drilling operation, the rod is applied with striking and advancing forces in addition to a rotating force as in the usual drilling operation so that there has been a possibility that the drilling rod is inclined and/or misplaced to prevent an accurate drilling operation.

It is therefore an object of the present invention to provide a rock drill with hydraulic control system by which the drilling rod can appropriately be controlled when it is advanced from a relatively hard rock layer to a relatively soft layer.

Another object of the present invention is to provide a rock drill in which advancing and striking efforts of the drilling rod are appropriately weakened in the initial stage of the drilling operation so that an accurate location of the drilling rod is made possible.

According to the present invention, the above and other objects can be accomplished by a rock drill comprising drilling rod means, striking actuator means for applying striking movements to said drilling rod means, reversible rotary actuator means for rotating the drilling rod means, reversible feed actuator means for advancing and retreating said drilling rod means, first conduit means connected with said striking actuator means for providing a supply of pressurized fluid to the striking actuator means to produce the striking movements of the striking actuator means, second conduit means connected with said rotary actuator means for providing a supply of pressurized fluid so that a positive driving rotation is produced in the rotary actuator means, advancing conduit means connected with said feed actuator means for providing a supply of pressurized fluid so that a rod advancing movement is produced in the feed actuator means, retreating conduit means connected with said feed actuator means for providing a supply of pressurized fluid so that a rod retreating movement is produced in the feed actuator means, first pressure relief means provided in said advancing conduit means and responsive to a pressure in the second conduit means to relieve the pressurized fluid in the advancing conduit means when the pressure in the second conduit means is increased beyond a first predetermined value, second pressure relief means provided in the first conduit means and responsive to a pressure difference between the advancing and retreating conduit means to relieve the pressurized fluid in the first conduit means when the pressure in the advancing conduit is not higher than that in the retreating conduit by a second predetermined value, so that advancing and striking forces on the drilling rod means are weakened when the pressure in the second conduit means is increased due to an increase in a driving torque on the driving rod means. According to the above arrangement of the present invention, it is possible to prevent the driving rod from being jammed and clogged in the rock even when it is advanced to a relatively soft layer. It is therefore possible to prevent any damage on the drilling rod.

In a preferable aspect of the present invention, the advancing conduit means is provided with pressure accummulating means for delaying transmittal of the pressurized fluid to the feed actuator means when the pressurized fluid is introduced into the advancing conduit means, one way restriction means provided between the advancing conduit means and the second pressure relief means for delaying transmittal of pressure from the advancing conduit means to the second pressure relief means, so that the advancing and striking forces on the drilling rod are weakened during initial stage of drilling operation.

The above and other objects and features of the present invention will become apparent from the following descriptions of preferred embodiments taking reference to the accompanying drawings, in which.

Figure 1:
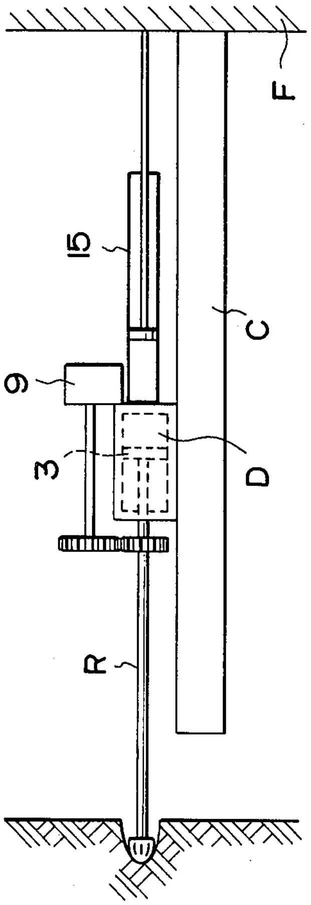
FIG. 1 is a diagrammatical side view of a rock drill to which the present invention can be applied.

Referring now to the drawings, particularly to FIG. 1, the rock drill shown therein includes a guide cell C supported on a stationary part or frame F. The guide cell C carries a drifter D which is movable longitudinally along the guide cell C. A hydraulic type feed actuator 15 is provided for effecting advancing and retreating movements of the drifter D. The drifter D has a drilling rod R which extends forwardly from the drifter D. The drilling rod R is rotatable with respect to the drifter D and a reversible hydraulic motor 9 is provided for rotating the rod R. In the drifter D, there is provided a hydraulically actuated striker 3 for striking an end of the rod R.

Figure 2:
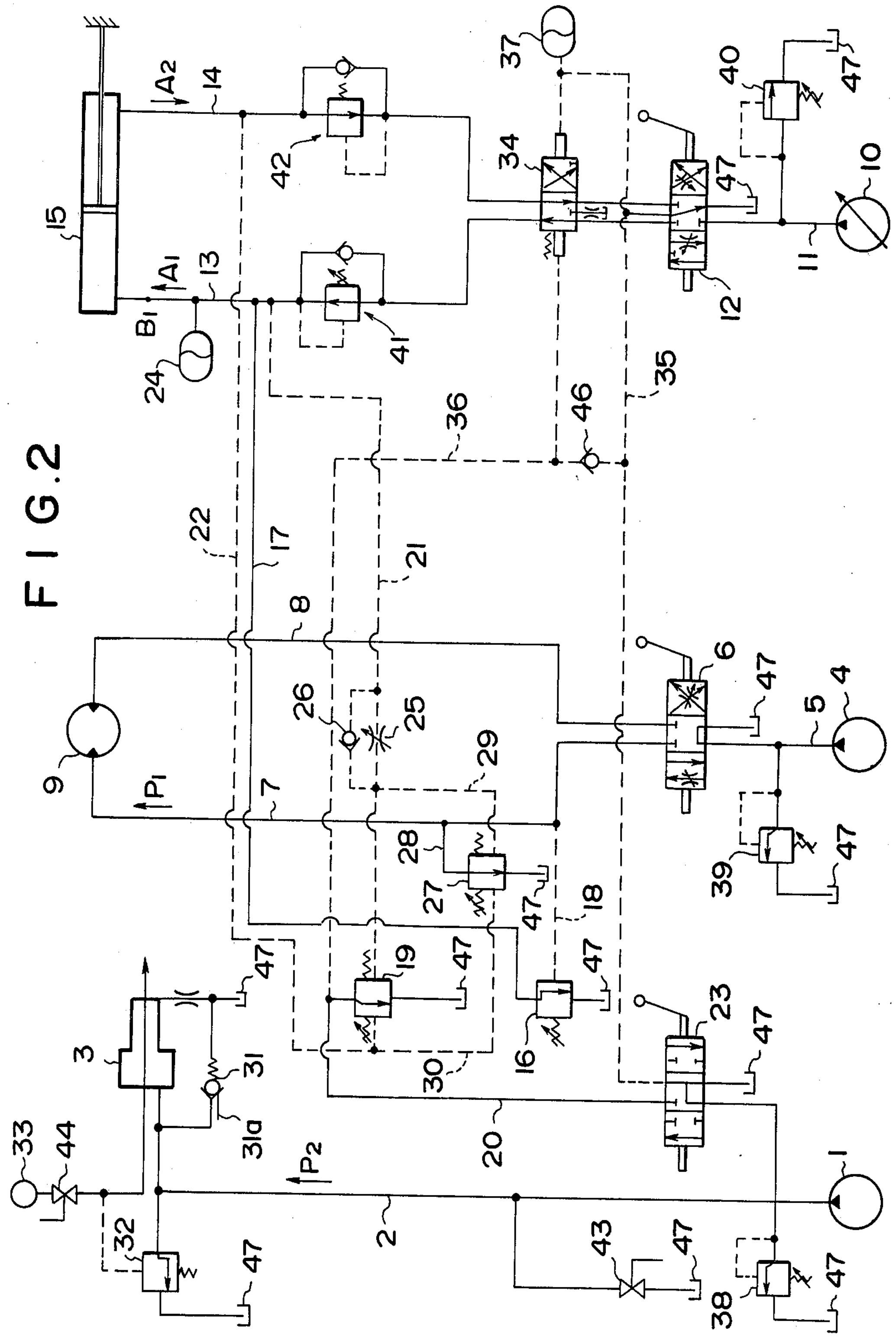
FIG. 2 is a diagram of a hydraulic system in accordance with one embodiment of the present invention.

Referring to FIG. 2, the hydraulic system shown therein includes a striking hydraulic pump 1 which has an outlet part connected through a striker conduit 2 to the striker 3 so as to provide a supply of pressurized hydraulic fluid to the striker 3 to operate the same. In the hydraulic system, there is also provided a motor driving hydraulic pump 4 which has an outlet conduit 5 connected through a three position selector valve 6 and then through a positive conduit 7 and a reverse conduit 8 with the motor 9. The valve 6 has a positive position, a neutral position and a reverse position. In the positive position, the valve 6 connects the conduit 7 to the conduit 5 and the conduit 8 to a reservoir 47 so that the motor 9 is rotated in the positive direction. In the reverse position, the conduit 8 is connected with the conduit 5 so that the motor 9 is rotated in the reverse direction. In the neutral position, the conduits 7 and 8 are disconnected from the conduit 5 so that the motor 9 is stopped.

In order to drive the feed actuator 15, there is provided a variable displacement type hydraulic pump 10 which has an outlet conduit 11 connected through a three position selector valve 12 and then through an advancing conduit 13 and a retreating conduit 14 with the actuator 15. The valve 12 has an advancing position, a neutral position and a retreating position. In the advancing position, the pump outlet conduit 11 is connected with the advancing conduit 13 to operate the actuator 15 in the advancing direction. In the retreating position, the valve 12 connects the conduit 11 with the conduit 14 so that the actuator 15 is moved in the retreating direction. In the neutral position, the conduits 13 and 14 are disconnected from the conduit 11.

The advancing conduit 13 is provided with a first relief valve 16 which is connected thereto through a bleed-off conduit 17. The valve 16 is of a pressure responsive type and a hydraulic pressure is applied thereto from the positive conduit 7 through a pilot conduit 18. It should be noted that the first relief valve 16 is opened when the pressure in the conduit 7 is increased beyond a predetermined value to relieve the pressure in the conduit 13 to the reservoir 47 so that the advancing effort by the actuator 15 is weakened.

The striking conduit 2 is provided with a second relief valve 19 which is connected thereto through a bleed-off conduit 20. The conduit 20 is provided with a selector valve 23 which has a striking position and a neutral position. In the striking position, the conduit 2 is connected with the relief valve 19 and, in the neutral position, the conduit 2 is opened to the reservoir 47. The second relief valve 19 is thus operated only in the striking position of the selector valve 23 and is applied on one hand with the pressure in the advancing conduit 13 and on the other hand with the pressure in the retreating conduit 14, respectively through conduits 21 and 22 so that it is opened when the pressure difference between the conduits 13 and 14 is below a predetermined value or the pressure in the conduit 13 is lower than that in the conduit 14 to thereby weaken the striking force which is applied by the striker 3 to the drilling rod R.

In FIG. 2, it will be noted that the advancing conduit 13 is provided with an accummulator 24 downstream of the position where the conduit 21 is connected with the conduit 13. The accummulator 24 functions to delay building up of high pressure in the actuator 15 so that, when the drilling rod R is abutted to a rock, the forward feeding force applied thereto is restricted for a certain period of time. It should further be noted that the conduit 21 is provided with a flow restriction 25 and in parallel with the restriction 25 there is provided a check valve 26 which opens only toward the conduit 13. It will thus be understood that transmittal of hydraulic pressure from the conduit 13 to the relief valve 19 is delayed by the restriction 25 when a high pressure is built up in the conduit 13 to thereby maintain the relief valve 19 in the open position and thus weaken the striking force of the striker 3.

In the embodiment shown in FIG. 2, the positive conduit 7 is provided with a third relief valve 27 which is connected thereto through a bleed-off conduit 28. The relief valve 27 is supplied on one side with the pressure in the advancing conduit 13 and on the other side with the pressure in the retreating conduit 14. For the purpose, the relief valve 27 is provided with a conduit 29 connected with the conduit 21 downstream of the restriction 25 and with a conduit 30 connected with the conduit 22. The relief valve 27 is thus opened when the absolute value of the pressure difference between the conduits 13 and 14 is below a predetermined value to thereby relieve the pressure in the conduit 7 to the reservoir 47 and weaken the driving torque of the motor 9.

The striking conduit 2 is provided with a limiting valve 31 which has a push-rod 31*a* adapted to engage with a stopper (not shown) and open the valve 31 to relieve the pressure in the conduit 2 to the reservoir so as to stop the striking operation. The striking conduit 2 is further provided with a flushing water responsive relief valve 32 which is responsive to the flow of flushing water supplied from a water source 33 through a valve 44 to the striker 3 so that, when there is any shortage of flushing water, the pressure in the conduit 2 is relieved to stop the operation of the striker 3.

In the advancing conduit 13 and the retreating conduit 14, there is provided a pilot type switching valve 34 for reversing the direction of operation of the actuator 15. The valve 34 is therefore connected with the conduit 20 on one hand through a conduit 36 and on the other hand through a check valve 46 and a conduit 35. The conduit 35 is provided with an accummulator 37 so that, when the relief valve 19 is opened and the pressure in the conduit 20 is therefore decreased, there will be produced a pressure difference between the conduits 35 and 36. When the pressure difference increases beyond a predetermined value, the valve 34 is actuated to reverse the direction of operation of the actuator 15 to thereby retreat the drilling rod R. The conduits 35 and 36 are connected with the valve 23 so that they are opened to the reservoir 47 when the valve 27 is in the neutral position.

In the illustrated hydraulic circuit, there are also provided appropriate relief valves 38, 39 and 40 for conduits 2, 5 and 11, respectively. The conduits 13 and 14 may be provided with pressure reducing valves 41 and 42, respectively. The conduit 2 may be provided with a drain valve 43.

In operation, the pressure in the advancing conduit 13 is relatively low when the drilling rod R is being advanced until the leading end of the rod R engages the rock. Thus, the pressure difference between the conduits 13 and 14 is small so that the second relief valve 19 and the third relief valve 27 are opened. It will therefore be understood the pressure in the striking conduit 2 is relieved through the conduit 20 so that the operation of the striker 3 is weakened. Further, the pressure in the conduit 7 is also relieved through the conduit 28 so that the driving torque of the motor 9 is weakened.

As soon as the leading end of the drilling rod R engages the rock, there will be an increase in the pressure in the conduit 13 due to an increase in the driving load. The high pressure built up in the conduit 13 is not at once transmitted to the actuator 15 but the transmittal of the pressure is delayed for a moment due to the provision of the accummulator 24. Further, the transmittal of the pressure in the conduit 13 to the second and third relief valves 19 and 27 is also delayed due to the existence of the flow restriction 25. Thus, in the initial period, the drilling operation is performed with a relatively small striking force, driving torque and advancing force to form a pilot portion of the drilled bore. This will make it possible to perform the drilling operation in an accurate manner.

After the aforementioned time delay, the high pressure in the conduit 13 is transmitted to the actuator 15 to increase the advancing or forward feeding force. At the same time, the high pressure in the conduit 13 is also transmitted to the relief valves 19 and 27 to close them. Thus, a high pressure is built up in the conduit 2 to increase the striking force of the striker 3. Similarly, a high pressure is also built up in the conduit 7 to increase the driving torque of the motor 9. Thereafter a normal drilling operation is performed.

In normal drilling operation, if the drilling rod R passes through a relatively hard rock to a relatively soft rock or to a layer of soil, there will be an abrupt increase in the advancing speed and therefore in the driving torque. Thus, there will be a pressure increase in the motor conduit 7. As soon as the pressure in the conduit 7 exceed a predetermined value, the first relief valve 16 is opened to thereby relieve the pressure in the advancing conduit 13 through the bleed-off conduit 17. Thus, the pressure in the conduit 13 is decreased and the forward feeding force is thereby weakened. The pressure decrease in the conduit 13 causes a decrease in the pressure difference between the conduits 13 and 14 so that the second and third relief valves 19 and 27 are opened. Thus, the striking and rotating forces are weakened as in the initial period of the drilling operation. It has been found that the arrangement is effective in performing a drilling operation through a relatively soft or weak earth layer. It should be noted that a satisfactory result can be obtained without the third relief valve 27.

In the operation wherein the drilling rod R is being retreated, a high pressure is built up in the retreating conduit 14 so that there is a sufficient pressure difference between the conduits 13 and 14 to close the third relief valve 27. However, since the pressure in the conduit 13 is lower than that in the conduit 14, the second relief valve 19 is opened. Thus, the drilling rod R is rotationally driven with a high torque but applied with only a slight striking force when it is being retreated. In the arrangement shown in FIG. 2, the conduit 29 may not be connected with the conduit 21 downstream of the flow restriction 25 but it may be connected, for example, at the point denoted B1, with the conduit 13 between the accummulator 24 and the actuator 15.

Figure 3:
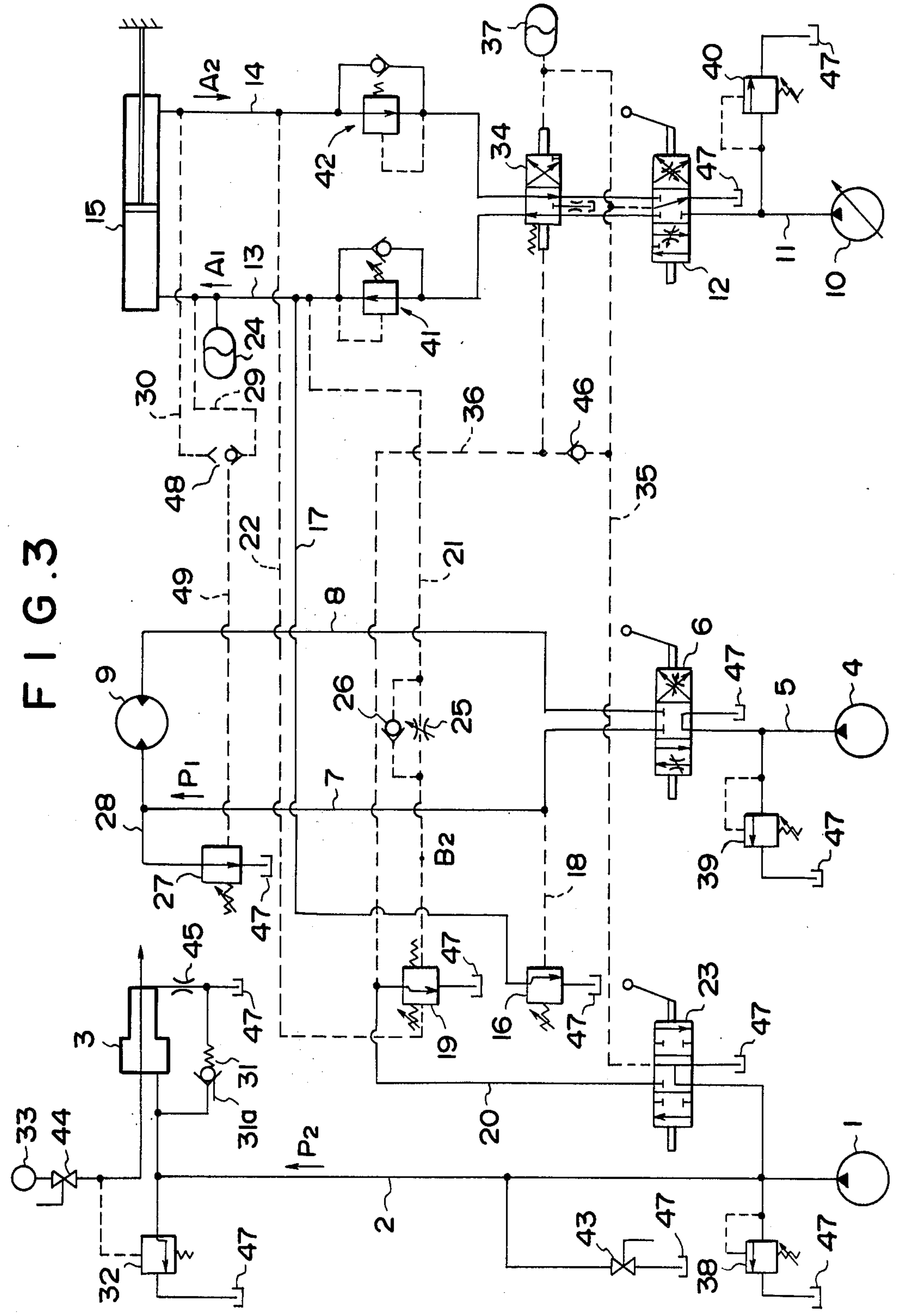
FIG. 3 is a diagram similar to FIG. 2 but showing another embodiment; and, FIG. 4 is a diagram showing a further embodiment.

Referring now to FIG. 3, there is shown another embodiment of the present invention in which corresponding parts are designated by the same reference numerals as in FIG. 1. In this embodiment, the third relief valve 27 connected through the bleed-off conduit 28 with the positive conduit 7 for the motor 9 is applied with a pressure drawn from the advancing conduit 13 at a point between the accummulator 24 and the actuator 15. For the purpose, the relief valve 27 is connected with a conduit 49 which is in turn connected through a shuttle valve 48 and a conduit 29 with the conduit 13. The shuttle valve 48 is also connected with a conduit 30 which leads from the retreating conduit 14 so that the pressure is applied to the relief valve 27 from either one of the conduits 13 and 14 which is higher in pressure than the other. In this embodiment, the conduit 29 may not necessarily be connected directly with the conduit 13 but may be connected, for example, at the point denoted B2, with the conduit 21 between the flow restriction 25 and the relief valve 19.

Figure 4:
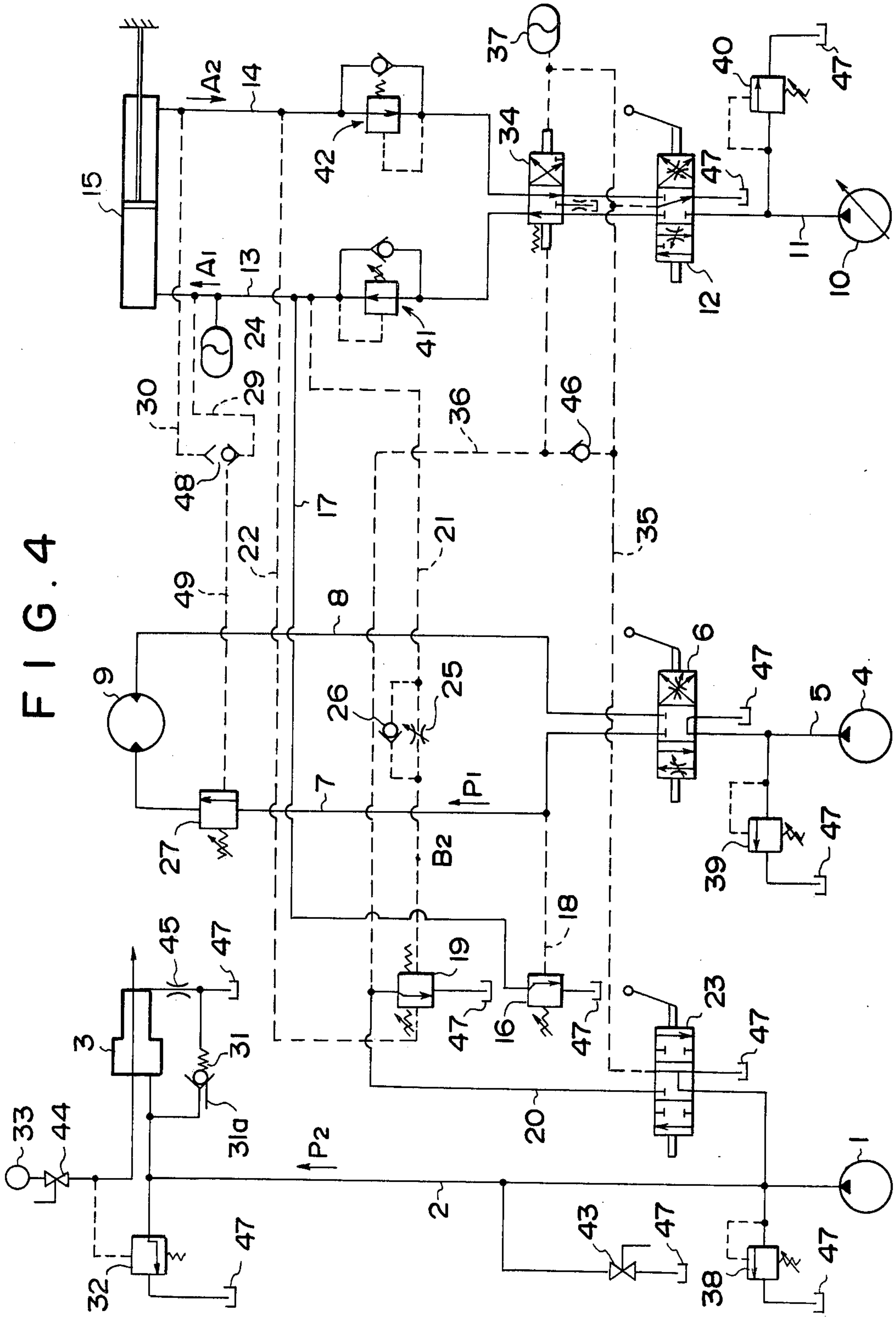

FIG. 4 shows a modification of the system shown in FIG. 3. In this embodiment, the third relief valve 27 is not connected with the conduit 7 through a bleed-off conduit but connected in series therewith. A pilot pressure is applied to the relief valve through conduit arrangements as in the embodiment of FIG. 3.

The invention has thus been shown and described with reference to specific embodiments, however, it should be noted that the invention is in no way limited to the details of the illustrated arrangments but changes and modifications may be made without departing from the scope of the appended claims.

We claim:

1. A rock drill comprising drilling rod means, striking actuator means for applying striking movements to said drilling rod means, reversible rotary actuator means for rotating the drilling rod means, reversible feed actuator means for advancing and retreating said drilling rod means, first fluid pump means, first conduit means connecting said first fluid pump means with said striking actuator means for providing a supply of pressurized fluid to the striking actuator means to produce the striking movements of the striking actuator means, second fluid pump means, second conduit means connecting said second fluid pump means with said rotary actuator means for providing a supply of pressurized fluid so that a positive driving rotation is produced in the rotary actuator means, third fluid pump means, advancing conduit means connected with said third fluid pump means and with said feed actuator means for providing a supply of pressurized fluid so that a rod advancing movement is produced in the feed actuator means, retreating conduit means connected with said third fluid pump means and with said feed actuator means for providing a supply of pressurized fluid so that a rod retreating movement is produced in the feed actuator means, first pressure relief means provided in said advancing conduit means and responsive to a pressure in the second conduit means to relieve the pressurized fluid in the advancing conduit means when the pressure in the second conduit means is increased beyond a first predetermined value, second pressure relief means provided in the first conduit means and responsive to a pressure difference between the advancing and retreating conduit means to relieve the pressurized fluid in the first conduit means when the pressure in the advancing conduit is not higher than that in the retreating conduit by a second predetermined value, pressure accumulating means connected through check valve means with said first conduit means for accumulating a pressure drawn from said first conduit means, switching valve means provided in said advancing and retreating conduit means and responsive to a pressure difference between said first conduit means and said accumulating means for changing the direction of movement of said feed actuator means when the pressure in the first conduit means is lower than that of said accumulating means by a third predetermined value.

2. A rock drill in accordance with claim 1 in which the advancing conduit means is provided with pressure accummulating means for delaying transmittal of the pressurized fluid to the feed actuator means when the pressurized fluid is introduced into the advancing conduit means, one way restriction means provided between the advancing conduit means and the second pressure relief means for delaying transmittal of pressure from the advancing conduit means to the second pressure relief means, so that the advancing and striking forces on the drilling rod are weakened during initial stage of drilling operation.

3. A rock drill in accordance with claim 2 in which said second conduit means is provided with third pressure relief means which is responsive to a higher one of the pressures in the advancing and retreating conduit means to relieve the pressure in the second conduit means when the higher pressure is below a predetermined value.

4. A rock drill in accordance with claim 3 in which said third pressure relief means is connected with the second conduit means through bleed-off conduit means.

5. A rock drill in accordance with claim 3 in which said third pressure relief means is connected through shuttle valve means with the advancing and retreating conduit means so that the higher pressure is applied thereto.

6. A rock drill in accordance with claim 3 in which said third pressure relief means is in fluid communication with each of said advancing and retreating conduit means.

7. A rock drill in accordance with claim 1 which further includes restriction means provided in pressure signal passage means for transmitting a pressure signal from the advancing conduit means to the second pressure relief means for delaying transmittal of the pressure signal from the advancing conduit means to the second pressure relief means, so that the advancing and striking forces on the drilling rod are weakened during the initial stage of the drilling operation.

8. A rock drill comprising drilling rod means, striking actuator means for applying striking movements to said drilling rod means, reversible rotary actuator means for rotating the drilling rod means, reversible feed actuator means for advancing and retreating said drilling rod means, first fluid pump means, first conduit means connecting said first fluid pump means with said striking actuator means for providing a supply of pressurized fluid to the striking actuator means to produce the striking movements of the striking actuator means, second fluid pump means, second conduit means connecting said second fluid pump means with said rotary actuator means for providing a supply of pressurized fluid so that a positive driving rotation is produced in the rotary actuator means, third fluid pump means, advancing conduit means connected with said third fluid pump means and with said feed actuator means for providing a supply of pressurized fluid so that a rod advancing movement is produced in the feed actuator means, retreating conduit means connected with said third fluid pump means and with said feed actuator means for providing a supply of pressurized fluid so that a rod retreating movement is produced in the feed actuator means, first pressure relief means provided in said advancing conduit means and responsive to a pressure in the second conduit means to relieve the pressurized fluid in the advancing conduit means when the pressure in the second conduit means is increased beyond a first predetermined valve, second pressure relief means provided in the first conduit means and responsive to the pressure for operating said feed actuator means to relieve the pressurized fluid in the first conduit means when the pressure in the feed actuator means is lower than a second predetermined value, so that advancing and striking forces on the drilling rod means are weakened when the pressure in the second conduit means is increased due to an increase in driving torque on the driving rod means, pressure accumulating means connected through check valve means with said first conduit means for accumulating a pressure drawn from said first conduit means, switching valve means provided in said advancing and retreating conduit means and responsive to a pressure difference between said first conduit means and said accumulating means for changing the direction of movement of said feed actuator means when the pressure in the first conduit means is lower than that of said accumulating means by a third predetermined value.

* * * * *